United States Patent [19]

Brady

[11] 3,739,888
[45] June 19, 1973

[54] APPARATUS FOR DRIVING A RECORDING INSTRUMENT

[75] Inventor: James J. Brady, Glendale, Calif.
[73] Assignee: Technical Oil Tool Corporation, Glendale, Calif.
[22] Filed: Jan. 31, 1972
[21] Appl. No.: 222,270

[52] U.S. Cl. ............ 192/48.92, 73/151.5, 74/789, 192/3.52, 192/20, 192/41 R, 346/33 WL
[51] Int. Cl. ...................... F16d 21/00, E21b 47/04
[58] Field of Search.................. 192/4 R, 20, 41 R, 192/30 R, 48.92, 3.52; 73/151.5; 346/33 WL; 74/789

[56] References Cited
UNITED STATES PATENTS

| | | | |
|---|---|---|---|
| 2,679,161 | 5/1954 | Yancey | 73/151.5 |
| 3,005,525 | 10/1961 | Phillips | 346/33 WL X |
| 3,009,355 | 11/1961 | Abs et al. | 73/151.5 |
| 3,374,484 | 3/1968 | Wyszyinski | 73/151.5 |
| 3,374,669 | 3/1968 | Redwine | 73/151.5 |

Primary Examiner—Allan D. Herrmann
Attorney—Thomas M. Small

[57] ABSTRACT

Mechanism for driving an odometer for logging footage drilled by an oil well drill or the like, and including a clutch driven by a measuring line, a shaft driven through the clutch, a sleeve telescoped onto the shaft and carrying a sprocket that drives the odometer through a chain, and a one-way coupling for turning the sleeve only as the shaft is driven forwardly. The one-way coupling includes a cage which turns with the sleeve, and gearing acts between the cage and the shaft as a spline coupling during forward rotation, but during reverse rotation of the shaft, the cage is held stationary and the gearing rotates a signal arm from a normal, idle position into a blocking position over an orifice to block air flow therefrom and create a pressure signal for actuating a cylinder for disengaging the clutch, and shifting a plunger of a driller's control valve. The signal arm is returned to its idle position, and the clutch remains disengaged until the plunger is pushed in manually to reactivate the driving mechanism.

11 Claims, 6 Drawing Figures

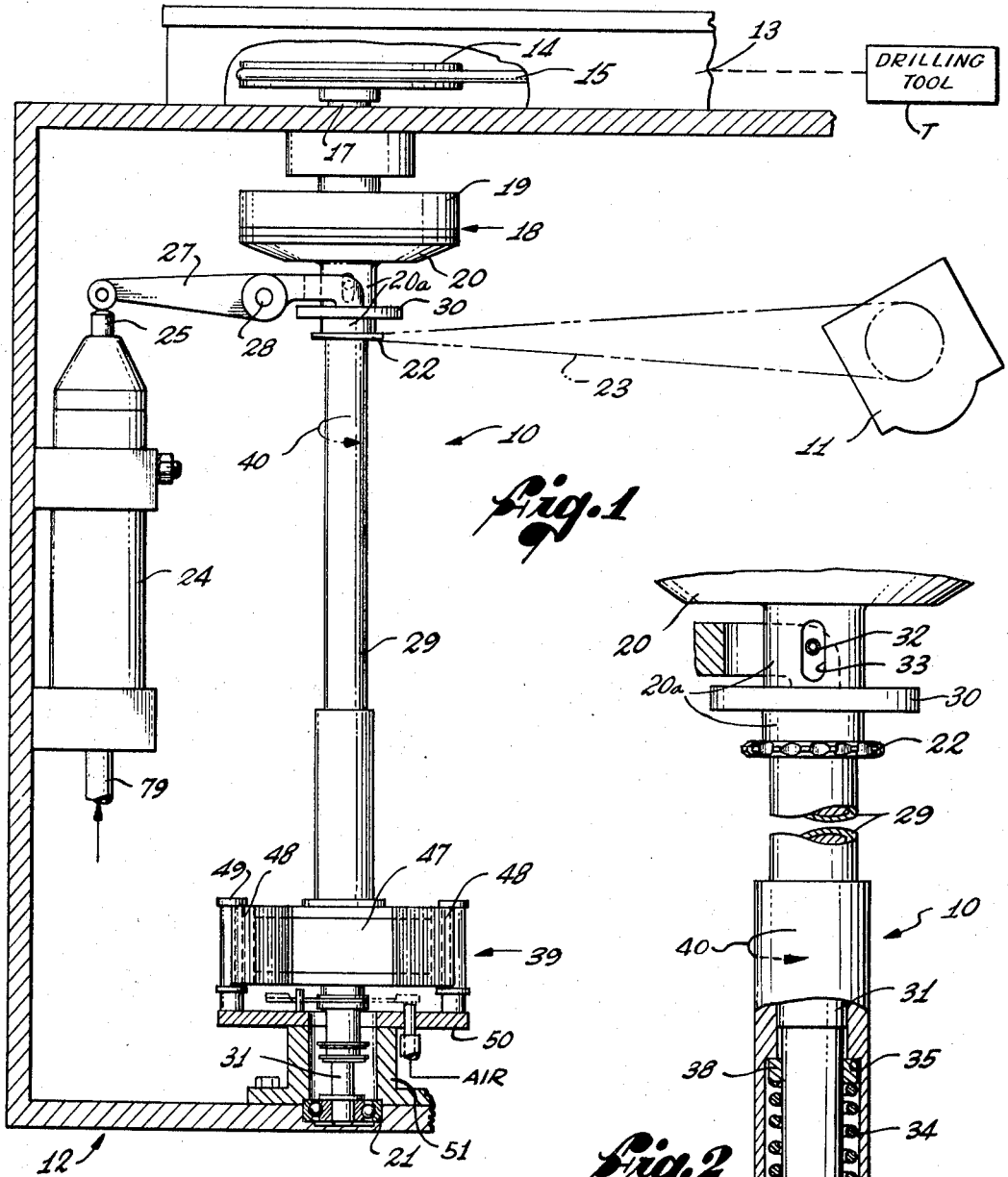
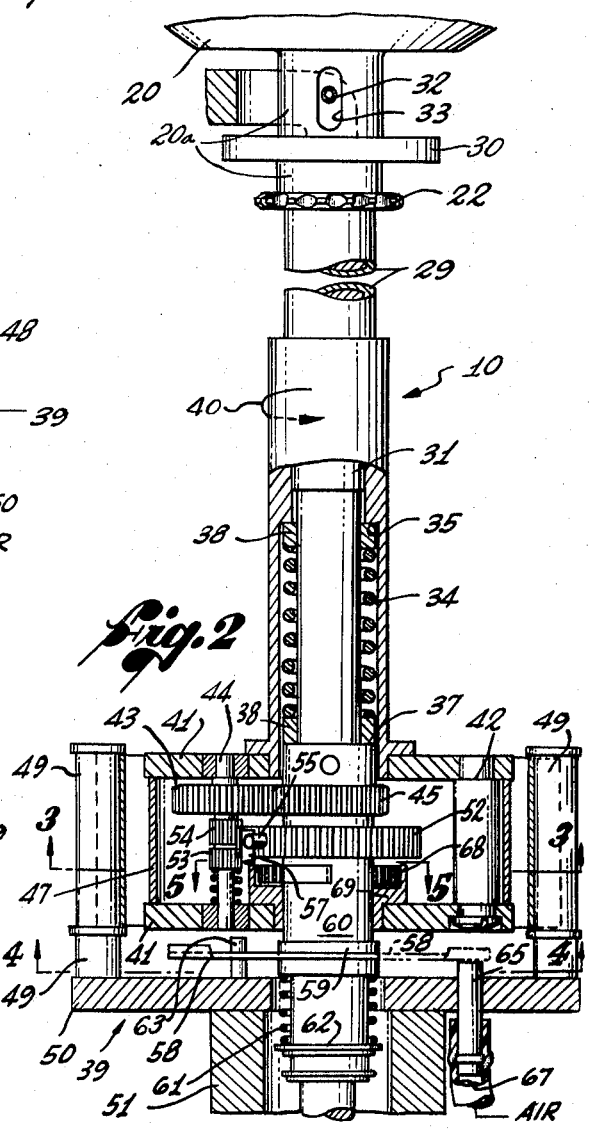
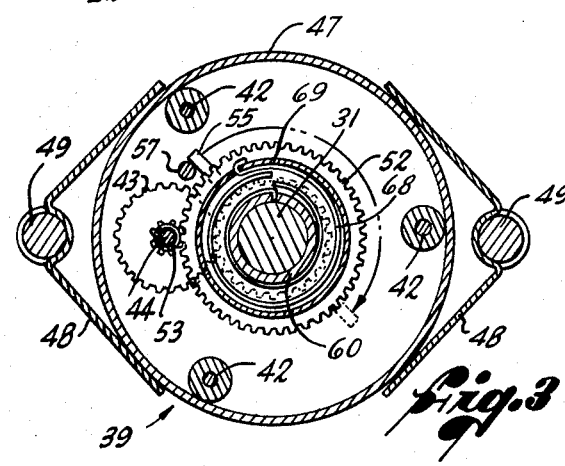
Fig.1
Fig.2
Fig.3

APPARATUS FOR DRIVING A RECORDING INSTRUMENT

BACKGROUND OF THE INVENTION

This invention relates to drilling operations, and particularly to the drilling of oil wells and the like in which it is important to produce and maintain a minute-by-minute written record or log of a number of factors regarding the drilling unit, usually including the total weight in suspension, torque, fluid pressure, speed of rotation, the rate of penetration, and the total penetration or depth of the hole. Information regarding such factors enables the drilling operator to control the drilling unit with optimum precision and a minimum of trouble. This invention has specific reference to the logging of the penetration of the drilling tool.

Various types of drilling recorders have been used in the past to log the downward travel of a drilling tool, and customarily are operated by a flexible steel cable, or so-called measuring line, which is stored on an above-ground reel, extends around pulleys on the derrick of the rig, and has a free end fastened to a member that moves downwardly with the drill string during the drilling operation, typically a so-called "gooseneck" on a swivel at the upper end of the Kelly by which the drill string is rotated as it is lowered into the hole. Thus, the lineal travel of the measuring line is a direct indication of the travel of the drill bit, and is used to drive an instrument such as an odometer, or sometimes a chart recorder, for recording total drilled footage.

In normal drilling operations, there are many circumstances which require raising of the drill string within the hole and subsequent lowering of the string for resumption of drilling. For example, the string often is raised for the addition of pipe as the depth of the hole increases, and sometimes is raised for removal of the bit on the lower end.

To avoid loss of the recorded total footage during raising and lowering of the string, and also to avoid possible damage to the recording instrument, it is desirable to deactivate the instrument prior to raising of the string, and to reactivate the instrument only when drilling is about to be resumed. Normally, such deactivation and reactivation have been accomplished manually by the driller, through a suitable control located somewhere near the drilling rig. Because of the danger of a failure to do so through oversight, and also because of the inconvenience often involved when the control is not conveniently located relative to the driller's station, there has been a need for a reliable automatic device for controlling the drilling recorder.

SUMMARY OF THE INVENTION

The present invention resides in a novel apparatus for driving a recording instrument during forward or drilling travel of the tool, deactivating the instrument automatically as an incident to the beginning of reverse travel of the tool, and reactivating the instrument preparatory to the resumption of drilling. To these ends, the driving apparatus has an input shaft adapted to be coupled by a clutch member to the drilling tool for movement in accordance with lineal movement of the tool, and has a drive coupling for connection to the recording instrument to drive the latter during forward motion of the tool. The drive coupling is driven by the input shaft during such forward motion, but reverse travel of the tool acts through the input shaft to disengage the clutch and leave the recording instrument deactivated, with an indicated footage that is the same as that attained prior to reversal of the tool travel.

Then, all subsequent travel of the tool, both reverse travel and subsequent forward travel necessary to return the tool to the bottom of the hole, occurs without registering any of such motion on the recording instrument. When the tool has been returned to the hole bottom and drilling is about to be resumed, the driller manually reactivates the driving apparatus and the recording instrument as he initiates the rest of the operations for resuming normal drilling.

More specifically, and as illustrated in the preferred embodiment shown herein, the drive coupling is carried by a sleeve which is rotatably supported on the input shaft and is connected to the latter by a one-way coupling which drives the sleeve, and thus the recording instrument, during forward rotation of the shaft but, upon reverse rotation of the shaft, does not drive the sleeve reversely. Instead, the sleeve is frictionally held against turning, and such reverse rotation of the shaft drives gearing in the coupling which moves a normally idle signal arm into position to produce a signal for disengaging the clutch member to uncouple the input shaft from the tool, and the entire driving apparatus is simultaneously returned to a ready position from which it can resume recording as soon as the clutch member is re-engaged by the driller.

Other aspects and advantages of the invention will become apparent from the following detailed description, taken in conjunction wiith the accompanying drawings.

BRIEF DESCRIPTION OF THE DRAWINGS

FIG. 1 is a fragmentary view, partly in cross-section and partly in side elevation, of a recorder driving apparatus and related structure embodying the novel features of the present invention;

FIG. 2 is an enlarged fragmentary view of the basic parts of the driving apparatus of FIG. 1, with additional portions broken away and shown in cross-section;

FIG. 3 is a cross-sectional view taken along line 3—3 of FIG. 2;

DETAILED DESCRIPTION

Figure 4:
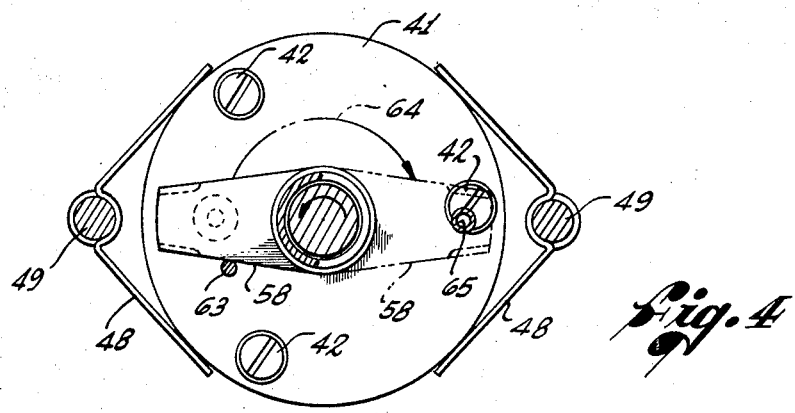
FIG. 4 is a cross-sectional view taken along line 4—4 of FIG. 2.

As shown in the drawings for purposes of illustration, the invention is embodied in an apparatus, indicated generally by the reference number 10, for driving a recording instrument such as an odometer 11 which logs the total footage drilled by an oil well drilling tool represented by the box T in FIG. 1. The apparatus is mounted in a case 12 that is positioned near the drilling rig and has a housing 13 on one side with a pulley 14 therein, around which a measuring line 15 is trained. The measuring line is connected in the usual manner to the drilling tool for movement in accordance with linear travel of the tool, and thus turns the pulley and its supporting shaft 17 back and forth as the tool is lowered and raised.

In general, the driving apparatus 10 comprises a clutch 18 having an input member 19 rotatable with the pulley shaft and an output member 20, a shaft assembly connected to the output member at one end and journaled in a bearing 21 on the case 12 at its other end, and a drive coupling 22 on the shaft assembly for driving the odometer 11 through an endless chain 23. A pneumatic cylinder 24 mounted inside the case 12 has a piston rod 25 which, when extended upwardly, rocks an actuating arm 27 clockwise about its pivot 28 to disengage the cluch 18 by moving the output member 20 downwardly away form the input member. This uncouples the shaft assembly and the odometer 11 from the measuring line pulley 14. The cylinder 24 preferably is of the type in which the rod 25 is extended by air pressure and retracted by a return spring (not shown) when the pressure is relieved.

As shown most clearly in FIG. 2, the drive coupling 22 comprises a sprocket around which the endless chain 23 is trained, and an elongated tubular sleeve 29 on which the sprocket is mounted, the clutch member 20 being fastened on the upper end of a sleeve forming a tubular hub 20a for the clutch member 20 and carrying an annular collar 30 which is engaged by the free end of the actuating arm 27. A shaft 31 of the shaft assembly extends loosely through both the clutch menber 20 and the sleeve 29, but is keyed to the clutch member 20 by a pin 32 (FIG. 2) projecting into an axially elongated slot 33 in the hub 20a of the clutch member 20 so that the latter and the shaft turn together but are axially movable relative to each other. The lower end of the hub 20a abuts rotatably against the end of the sleeve 29 adjacent the sprocket.

The sleeve 29 is both slidably and rotatably mounted on the shaft 31, and is urged upwardly relative to the shaft by a coiled spring 34 telescoped over the shaft, inside the sleeve, and compressed between an internal, downwardly facing shoulder 35 on the sleeve and an upwardly facing shoulder 37 around the shaft, thus normally holding the clutch members 19 and 20 in frictional, coupled engagement. Plastic lubrication and centering rings 38 preferably are disposed between the shoulders 35 and 37 and the opposite ends of the spring 34.

To rotate the sleeve 29 and drive the odometer 11 during drilling travel of the drilling tool, the sleeve is drivingly connected to the shaft 31 by a one-way coupling, indicated generally by the number 39, acting between the shaft and the lower end of the sleeve to turn the sleeve with the shaft in one direction of rotation of the shaft, the direction indicated by the arrows 40 in FIGS. 1 and 2. This is the "forward" direction of rotation produced by "forward" or drilling travel of the drilling tool.

During such forward rotation, the sleeve 29 is driven in the same direction by the one-way coupling 39, thereby turning the sprocket at a rate corresponding to the rate of lineal travel of the drilling tool, to drive the odometer 11 and record the footage drilled by the tool. During reverse rotation of the shaft, produced by the measuring line 15 and the pulley 14 as the tool is raised, the shaft turns reversely within the sleeve, which remains stationary in the position which it had attained when forward rotation ceased. Accordingly, the odometer remains in th condition achieved prior to the reversal of the tool, and retains the footage reading which indicates the previously-achieved total depth of penetration.

An important aspect of the present invention is the construction and operation, of the one-way coupling 39, which is designed not only to permit the shaft 31 to turn reversely relative to the drive coupling 21, but also to produce a signal for actuating the cylinder 24 to disengage the clutch 18 as an incident to such reverse turning. The coupling 39 deactivates the driving apparatus for the duration of the manipulation of the drilling tool, while leaving the apparatus in condition for reactivation when the tool has been returned to the bottom of the hole and is ready for the resumption of drilling.

For these purposes, the one-way coupling 39 includes a housing or cage formed by two disk-shaped end-walls 41 which are mounted on the lower end of the sleeve 29 for rotation therewith about the drive shaft 31, the upper endwall being fastened to the sleeve 29 and connected to the lower endwall by a plurality of fasteners 42, including spacer sleeves, and a cylindrical sidewall 47 which encloses the interior of the cage. A planetary gear 43 is mounted in the cage on a shaft 44 in spaced parallel relation with the drive shaft, and a pinion gear 45 is pinned to the drive shaft to turn with the shaft in meshing engagement with the planetary gear 43.

In addition, the one-way coupling 39 includes means for preventing rotation of the gears 43 and 45 in one direction from a preselected angular relation so that the gears act as a positive spline connection in one direction in this angular relation, but are relatively rotatable in the opposite direction, and the cage is frictionally held by one or more drag devices 48, herein two, which permit forward rotation of the cage and the sleeve 29 with the shaft 31 but anchor the cage against reverse turning so that such turning rotates the planetary gear, rather than the cage. Such rotation of the planetary gear, in turn, is used to produce the declutching signal after a selected amount of reverse rotation of the shaft 31.

More specifically, the drag devices 48 comprise two generally V-shaped spring plates which are mounted on two pins 49 projecting across opposite sides of the cage from a stationary mounting disk 50 that is supported on a sleeve 51 bolted to the lower wall of the case 12 around the bearing 21. The spring plates are pressed against the cylindrical sidewall 47 to exert sufficient frictional drag thereon to immobilize the cage during reverse rotation of the drive shaft 31 and turning of the planetary gear within the gage, but slip on the cage to permit the latter to turn with the drive shaft during forward shaft rotation, when relative rotation of the gears 43 and 45 is prevented.

In the present instance, a second pinion, or output gear 52, is loosely disposed around the drive shaft 31 within the cage, beside the first pinion gear 45, a second planetary gear 53 is mounted on the gear shaft 44 for rotation therewith, normally in meshing engagement with the output gear 52, and a spacer 54, preferably a gear similar to the gear 53, is loosely mounted on the gear shaft between the two gears 43 and 53. Reverse rotation of the pinion gear 45 with the drive shaft thus rotates the planetary gears 43 and 53 together, and the latter gear rotates the output gear 52 about the drive shaft 31.

Herein, the means for preventing rotation of the gears 43 and 45, during forward rotation of the drive shaft, comprise a pin 55 projecting radially from one side of the output gear 52, as shown in FIGS. 2 and 3, and a second pin 57 extending across the path of the pin 55 from one of the endwalls 41 of the cage, in advance of the pin 55 in the forward direction. By blocking rotation of the gear 52, these pins act through the gear 53, the gear shaft 44, the gear 43 and the pinion gear 45 to prevent relative rotation of the shaft 31 and the cage. A filled tooth (not shown) on the output gear will serve the same function.

In any event, forward rotation of the drive shaft 31 turns the pinion gear 45 thereon and tends to rotate the planetary gears 43 and 53, and the gear 53 simultaneously tends to turn the output gear 52. When the stop pin 55 is in blocking engagement with the pin 57, forward rotation of the gears is prevented, and the cage is rotated with the drive shaft against the drag of the springs 48. Whenever the drive shaft 31 begins to turn reversely (that is, upon reversal of the direction of lineal motion of the drilling tool), the gears 43 and 53 are free to turn in the reverse direction and to move the stop pin 55 away from the pin 57, while the cage is frictionally anchored against turning reversely. As a result, the cage and the sleeve 29 remain stationary, leaving the odometer 11 with a reading indicating the previously achieved depth of penetration, as the drilling tool is raised and the shaft 31 begins to turn in reverse, and such reverse turning rotates the output gear 52 reversely, clockwise as viewed in FIG. 3.

As shown most clearly in FIG. 2, a signal arm 58 is mounted on the shaft 31 immediately beneath the one-way coupling 39 by means of a hub 59 in the form of a sleeve which is loosely telescoped over the shaft, and this hub abuts against the lower end of a sleeve 60 constituting an extension of the hub of the output gear 52, and rotatable with the output gear about the shaft 31. The hub 59 is pressed against the extension 60 by a coiled spring 61 fitted over the shaft and compressed between the hub and a collar 62 around the shaft below the spring. This forms a slip-friction coupling between the signal arm 58 and the output gear 52, tending to turn the arm with the gear.

During forward operation of the shaft assembly, during which the output gear rotates forwardly with the shaft 31, the signal arm 58 is held stationary in a preselected idle position, shown in full lines in FIGS. 2 and 4, by a stop pin 63 stationarily mounted on the mounting disk 50 and projecting across the path of the signal arm to block forward rotation of the arm. Thus, the hub 59 slips relative to the extension 60 of the output gear 52, and the arm remains in the idle position. When the shaft 31 begins to turn reversely, however, the reverse rotation of the output gear 52 begins to rotate the hub 59 of the arm reversely, clockwise as indicated by the arrow 64 in FIG. 4, thereby swinging the arm clockwise away from the stop pin 63 at a rate determined by the rate of reverse rotation of the shaft and the ratio of the gearing between the shaft and the arm.

Spaced a preselected angular distance from the idle position of the signal arm 58 is a stationary nozzle 65 on the disk 50 to which a continuous flow of air is supplied through a passage 67. The orifice of this nozzle is positioned to be blocked by the signal arm after a selected amount of rotation of the latter from its idle position to the position shown in broken lines in FIGS. 2 and 4, and the change in back pressure in the nozzle and in its supply passage 67 is the signal which is used to actuate the air cylinder 24 in a manner which is within the skill of the art and is illustrated in the simplified control circuitry in FIG. 6 to be described. The amount of rotation of the arm 58 required to effect de-clutching is variable, according to the amount of reverse shaft rotation desired before de-clutching is effected, simply by varying the angular spacing of the pin 63 and the nozzle 65.

When the cylinder 24 is actuated, its piston rod 25 is extended to rock the arm 27 clockwise, as viewed in FIG. 1, thereby pushing downwardly on the collar 30, shifting the output member 20 of the clutch 18 away from the input member 19, and simultaneously shifting the sleeve 29 and the one-way coupling 39 axially along the shaft 31, downwardly as viewed in the drawings. Such downward movement is permitted by the pin-and-slot connection 32, 33 between shaft 31 and the hub 20a of the clutch member 20, and by the spring 34 compressed within the sleeve between the shoulders 35 and 37, the latter shoulder being formed by the end of the hub of the pinion gear 45. In addition to disengaging the clutch, this axial motion of the sleeve 29 shifts the planetary gear 53 axially relative to the output gear 52 far enough to disengage the output gear from the planetary gear 53, shifting it into engagement with the spacer gear 54 which is loosely mounted on the gear shaft 44.

Figure 5:
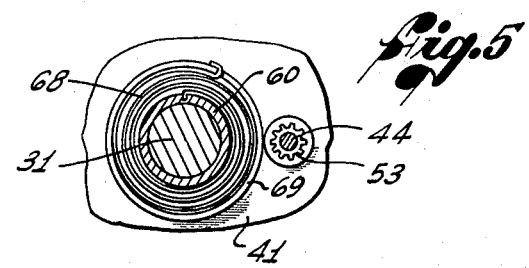
FIG. 5 is a fragmentary cross-sectional view taken along line 5—5 of FIG. 2.

As shown most clearly in FIGS. 2 and 5, a main spring 68 is wrapped spirally around the hub extension 60 in an annular recess defined by a flanged sleeve 69 telescoped over the hub extension and fastened to the lower endwall 41 of the cage. The spring is anchored at one end to the hub extension and at the other end to the flanged sleeve (See FIG. 5), so that rotation of the output gear 52 during reverse rotation of the shaft 51 winds up the spring as the signal arm 58 is rotated toward the nozzle 65.

Then, when the shaft assembly is de-clutched and the gear 53 is shifted out of engagement with the output gear 52, the latter is released and the main spring 68 is freed to unwind. In so doing, the spring returns the signal arm 58 and the output gear 52 to their starting positions with the pins 55 and 57 in abutting engagement and with the signal arm 58 against the pin 63.

In this condition, the driving apparatus is ready for immediate reactivation, simply by re-engaging the clutch 18 when drilling is to be resumed. Any movement of the drilling tool prior to such reactivation, either up or down, has no effect on the odometer 11 an thus cannot disturb the footage total that was logged prior to the initial reversal.

Figure 6:
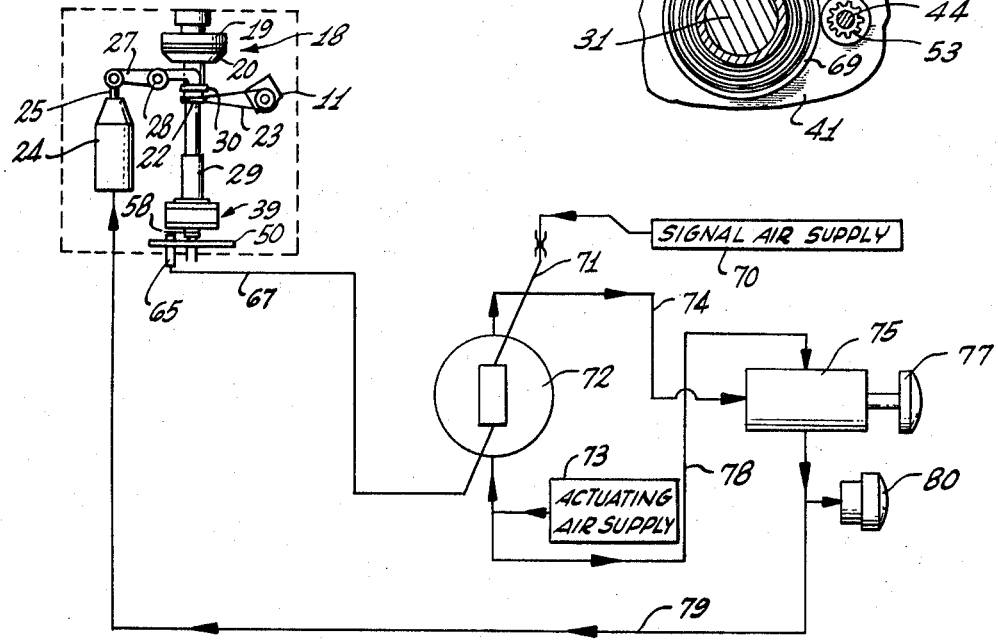
FIG. 6 is a schematic flow diagram of the basic parts of a simplified control system for the driving apparatus.

In general, the control circuitry, as shown in simplified form in FIG. 6, includes a source 70 of signal air at a suitable pressure, such as 20 pounds per square inch (P.S.I.), connected by a restricted line 71 to a pilot valve 72 from which the air flows through line 67 to the nozzle 65. When the orifice of the nozzle is blocked by the signal arm 58, the resulting increase in back pressure in the line 67 actuates the pilot valve 72 in a conventional manner to admit air from a second source 73, at a suitable pressure such as 90 P.S.I., into a line 74 leading to a control valve 75 at the driller's station.

When line 74 is pressurized, the plunger 77 of the driller's control valve 75 is thrown out, and actuating pressure from the high-pressure source 73 is introduced through a branch line 78 and the driller's control valve 75 to a line 79 leading to the de-clutch cylinder 24. This actuates the de-clutch cylinder to disengage the clutch 18, simultaneously returning the signal arm 58 to its idle position. The air cylinder remains in the de-clutch condition, however, as long as the plunger 77 of the driller's valve remains out. Accordingly, the odometer remains deactivated during any subsequent raising and lowering of the drill string. Pressurization of the line 79 also serves to activate a signal device, such as a light 80 at the driller's station, indicating that the odometer is de-clutched.

When the drill bit has been returned to the bottom of the hole and drilling is to be resumed, the driller simply pushes the plunger 77 in as he initiates drilling. This releases the actuating pressure on the de-clutch cylinder 24 and permits its return spring to retract the piston rod 25, thus engaging the clutch 18 to reactivate the odometer 11. At the same time, the signal light 80 is turned off and the system is returned to the original condition.

From the foregoing, it will be apparent that the present invention provides a driving apparatus that effectively deactivates a recording instrument automatically as an incident to reversal of the travel of the drilling tool, preferably without even momentary reverse operation of the recording instrument, while using the initial reverse travel of the tool to de-clutch the driving apparatus and prepare the same for immediate reactivation when drilling is to be resumed. Moreover, the apparatus is relatively simple and reliable in construction and operation. It also will be apparent that, while a particular form has been illustrated and described, various modifications and changes may be made without departing from the spirit and scope of the invention.

I claim:

1. Apparatus for driving a drilling recorder during drilling travel of a drilling tool, deactivating the recorder during reverse travel of the tool, and reactivating the recorder for the resumption of drilling travel, said apparatus comprising:

a drive shaft;

a selectively engageable and disengageable clutch member on said shaft for coupling and uncoupling the latter and, when the shaft is coupled, turning the shaft at a rate correlated with the linear travel of the tool;

a sleeve telescoped over said shaft and rotatable about the shaft, said sleeve having means thereon for driving the recorder as the sleeve rotates;

a cage connected to said sleeve for rotation therewith, and having an interior into which said shaft projects;

a pinion gear mounted on said shaft within said cage, and rotatable with said shaft;

a planetary gear mounted on said cage and meshing with said pinion gear to turn said cage and said sleeve as said pinion gear rotates;

means forming a stop and preventing rotation of said pinion gear relative to said planetary gear in one direction from a preselected angular relation of said gears, thereby locking said cage and said sleeve to said shaft for rotation therewith as said shaft is turned in one direction during drilling travel of the tool, but permitting rotation of said pinion gear in the opposite direction, during reverse travel of the tool from any attained position;

means preventing rotation of said cage and said sleeve during rotation of said pinion gear in said opposite direction but permitting rotation of said cage and said sleeve with said shaft during rotation of said shaft in said one direction, thereby to drive the recorder for recording of drilling travel while preventing reverse operation of the recorder during reverse travel of the tool;

a gear assembly including an output gear driven by said planetary gear as said pinion gear turns relative to said cage during reverse operation of said shaft;

a signal arm having a hub telescoped onto said shaft;

a slip-friction coupling between said output gear and said hub urging said hub to turn with said output gear but permitting slipping of said hub relative to the output gear;

a second stop holding said arm in a selected idle position as said shaft is turned in said one direction during drilling travel of the tool, but permitting rotation of said hub and said arm with said output gear out of said idle position during reverse travel of the tool;

means operated by said signal arm after a selected amount of said reverse operation to produce a signal for disengaging said clutch member, thereby to deactivate said recorder by uncoupling said shaft;

spring means operable upon disengagement of said clutch to return said signal arm to said idle position and said gears to said angular relation;

and selectively operable means for re-engaging said clutch member when the tool has been returned to any previously attained drilling position for resumption recording.

2. Apparatus for driving a recording instrument during forward travel of a drilling tool, deactivating the instrument during reverse travel of the tool, and reactivating the instrument for the resumption of forward travel, said apparatus comprising:

a drive shaft;

selectively engageable and disengageable clutch means for coupling and uncoupling said drive shaft and operable when coupled to turn the latter at a rate corresponding to the lineal travel of said drilling tool;

a drive coupling supported on said drive shaft and connectible to the instrument to drive the latter as said drive coupling turns with said shaft, said drive coupling being rotatable relative to said shaft;

means connecting said drive coupling to said shaft for rotation of the coupling and the shaft together in a preselected angular relation in one direction of rotation of the shaft, thereby to drive the instrument during forward travel of said tool, but permitting reverse rotation of the shaft relative to the coupling from said angular relation during reverse travel of said tool from an attained drilling position while said clutch is engaged;

means for preventing reverse rotation of a said coupling with said shaft, thereby preventing reverse operation of the instrument;

means responsive to a preselected amount of said reverse rotation of said shaft to actuate said clutch and uncouple said shaft, thereby deactivating said driving apparatus;

and means for re-engaging said clutch when the drilling tool has been returned to the previously attained drilling position preparatory to resumption of drilling travel.

3. Apparatus for driving a recording instrument during forward travel of a drilling tool, deactivating the instrument during reverse travel, and reactivating the instrument for the resumption of forward travel, said apparatus comprising:

a drive member selectively engageable and disengageable clutch means for coupling and uncoupling said drive member and operable when coupled to drive the latter reversibly at a rate corresponding to the lineal travel of the drilling tool;

a drive coupling connectible to the instrument to drive the instrument and record forward travel of the drilling tool;

means connecting said drive coupling to said drive member for driving of the coupling by the drive member while the latter is driven in one direction during forward operation of the drilling tool;

means responsive to movement of said drive member in the other direction during reverse operation of the drilling tool to produce a signal for disengaging said clutch means and leaving said drive coupling in a position corresponding to the greatest penetration of the drilling tool;

and means for re-engaging said clutch means when the drilling tool has been returned to the previously attained position of greatest penetration, preparatory to resumption of drilling.

4. Driving apparatus as defined in claim 3 wherein said drive member is a shaft supported for reversible rotation, and said drive coupling is rotatably mounted on said shaft, said connecting means comprising a one-way coupling between said shaft and said drive coupling for turning the latter with said shaft during rotation thereof in said one direction, and permitting relative rotation of the shaft in said other direction.

5. Driving apparatus as defined in claim 4 in which said responsive means include a signal arm mounted on said shaft, means holding said signal arm in a preselected idle position during rotation of said shaft and said coupling in said one direction, means for turning said signal arm out of said idle position in response to rotation of said shaft in said other direction, and signal means for producing said signal when said arm is turned into a second position angularly spaced from said idle position.

6. Driving apparatus as defined in claim 5 in which said shaft carries a pinion gear, and said drive coupling includes a cage having a planetary gear meshing with said pinion gear, means preventing rotation of said planetary gear by said pinion gear during rotation of said shaft in said one direction, whereby said pinion drives said cage with said shaft during forward rotation, and means permitting such driving of said cage but preventing reverse driving thereof.

7. Driving apparatus as defined in claim 6 in which said means for turning said signal arm includes additional gearing driven by said planeatary gear during reverse driving of said cage, and a slip-friction clutch between said additional gearing and said signal arm permitting said arm to be held in said idle position during forward rotation of said shaft and said cage.

8. Driving apparatus as defined in claim 5 in which said signal means comprise an orifice positioned along the path of said signal arm to be blocked thereby when the arm is in said second position, means for supplying a flow of signal an under pressure to said orifice, and means for responsive to an increase in the back pressure of said signal and resulting from blocking of the orifice by said arm, and operable to disengage said clutch means.

9. Driving apparatus as defined in claim 8 in which said clutch means include a fluid-operated actuating cylinder for coupling and uncoupling said drive member, and wherein said means responsive to an increase in said back pressure include a pilot valve operated by said increase, and means controlled by said pilot valve for supplying actuating fluid to said cylinder.

10. Driving apparatus as defined in claim 9 in which said last-mentioned means include driller's control valve operated automatically by said pilot valve to actuate said cylinder and uncouple said drive member, and having a manually actuator for re-engaging said clutch means when drilling is to be resumed.

11. Driving apparatus as defined in claim 5 further including spring means for returning said signal arm to said idle position upon disengagement of said clutch means.

* * * * *